UNITED STATES PATENT OFFICE.

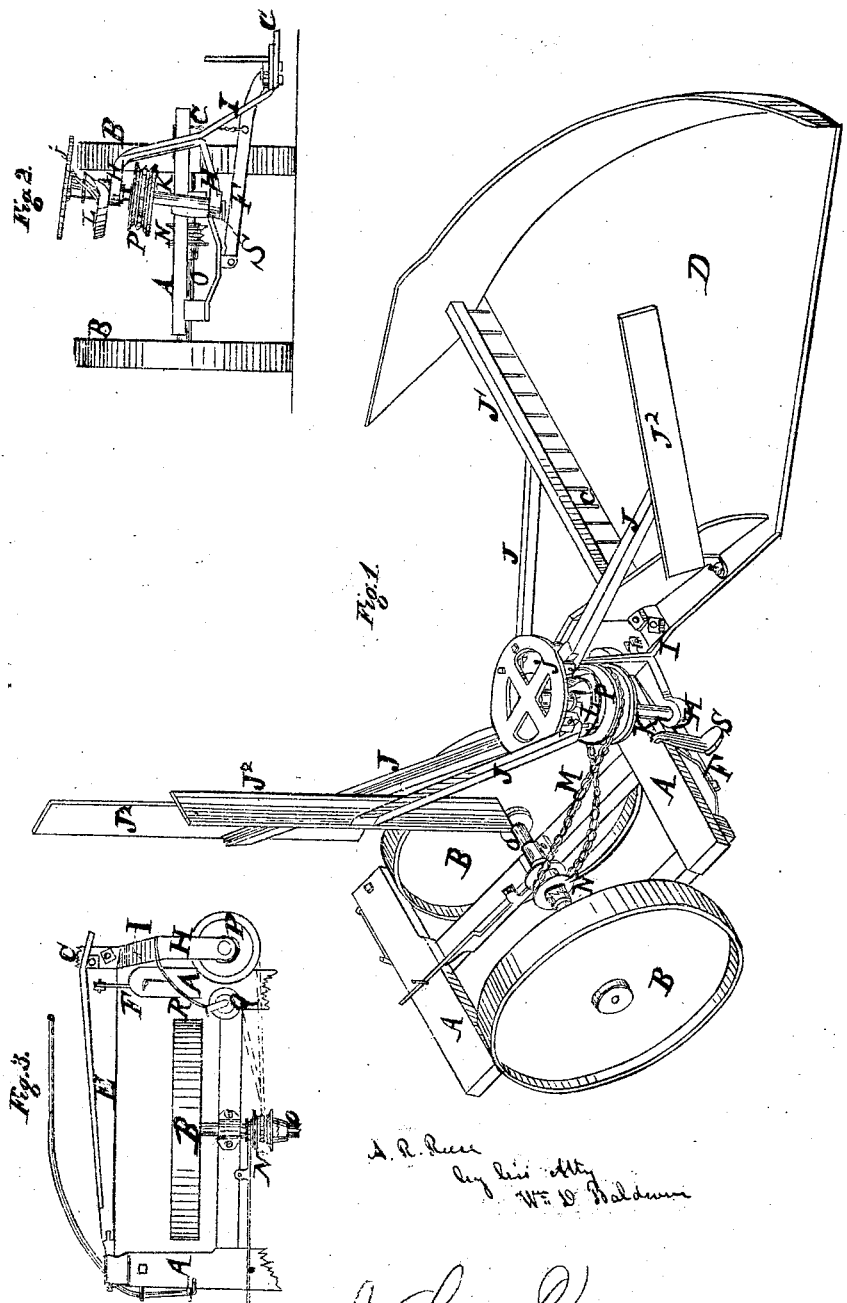

ADAM R. REESE, OF PHILLIPSBURG, NEW JERSEY.

IMPROVEMENT IN RAKES FOR HARVESTERS.

Specification forming part of Letters Patent No. 41,641, dated February 16, 1864.

*To all whom it may concern:*

Be it known that I, ADAM R. REESE, of Phillipsburg, in the county of Warren and State of New Jersey, have invented certain new and useful Improvements in Automatic Rakes for Harvesters, of which the following is a full, clear, and exact description, reference being had to the accompanying drawings, which make part of this specification, and in which—

Figure 1 represents a view in perspective of a harvesting-machine to which my improvements are applied; Fig. 2, a view in elevation of a portion of the same, as seen from behind, with the rake-arms detached; and Fig. 3, a plan or top view of some of the parts shown in Fig. 2.

In the accompanying drawings a stout main or gearing frame, A, is shown as supported upon two large driving-wheels, B. The finger-beam C and platform D are hinged to the frame by means of the drag-bar E and coupling-link F, or in any other usual and well-known way. A stop-chain, c, serves to prevent the finger-beam from descending too low. The raking mechanism is mounted in a bracket, H, supported by an arm, I, the lower end of which is bolted to the finger-beam in such manner that it may readily be detached when desired. The rake-arms J are pivoted near one end to a ring, $j$, mounted upon a spindle, K, turning in bearings in the bracket H, and the proper rising and falling movements are communicated by means of a stationary guide-slot or cam-ring, L, in which the ends of the rake-arms traverse, being provided with friction-rollers to make them run more easily. A rake, J', is mounted upon one only of the arms, the others being provided with blank heads $J^2$ which act as reel-ribs to press the grain back upon the platform, but not to rake it off. The rake-shaft is rotated by means of an endless belt or chain, M, encircling a pulley, N, on the driving-axle O and a corresponding pulley, P, on the rake-shaft. A tightening-pulley, Q, mounted on a strong spring, R, serves to keep the chain taut, no matter how much the finger-beam and rake may rise and fall. The rake is prevented from descending too low by a stop, S, upon the frame.

The operation of the machine is such that as it advances through the field the rake-arms are caused to enter the standing grain and press it back against the cutting apparatus which severs it. The continued backward movement of the arms then deposits the grain upon the platform, whence it is swept by the rake and discharged in gavels upon the ground. The rake and heads, after passing over the back of the platform, are elevated until they occupy a position near by at right angles to their former one, as shown in Fig. 1, in which attitude they move forward over the gearing-frame until the proper moment for them to descend to enter the standing grain, which movements are repeated at every revolution of the rake-shaft.

It is obvious that the rake-shaft could be used in an inclined as well as in an upright position by a corresponding alteration of the guide-slot, the mode of driving the rake affording great facility of adaptation to such changes.

I am aware that an automatic raking mechanism mounted upon the yielding finger-beam of a harvester is contained in a patent granted to Reuben Hoffheins, May 20, 1862, and do not therefore broadly claim such device; but

What I claim as my invention, and desire to secure by Letters Patent, is—

1. The combination of the yielding finger-beam, the raking mechanism, and the main or gearing frame, when the several parts are constructed and arranged and operate substantially in the manner described, for the purposes specified.

2. The combination of the bracket H, (upon the finger-frame,) in which the raking mechanism is mounted, with the stop S upon the main frame, when arranged and operating substantially as described, for the purpose set forth.

3. The combination of the rake-shaft K with the driving-shaft O by means of the endless chain M, when arranged and operating substantially in the manner described, for the purpose of driving the rake in any position of its shaft without the intervention of gearing, as set forth.

4. The combination of the spindle K, ring $j$, and cam-ring L with the rake-arms, substantially as described, for the purpose set forth.

In testimony whereof I have hereunto subscribed my name.

ADAM R. REESE.

Witnesses:
JOHN S. BACH,
P. R. HAGERMAN.